HARMAN, T. E. CANNON AND N. C. BETTENBURG.
BRAKE BEAM FULCRUM.
APPLICATION FILED FEB. 12, 1920.
1,374,448.
Patented Apr. 12, 1921.
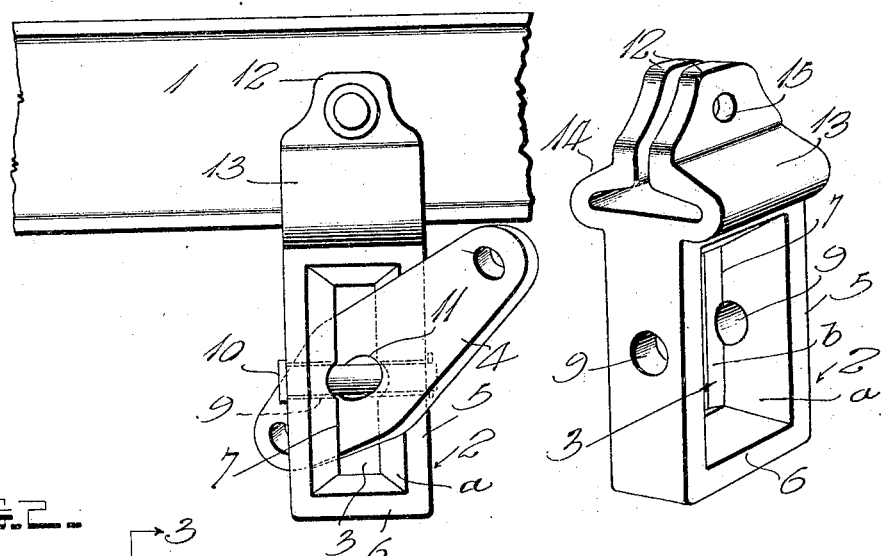
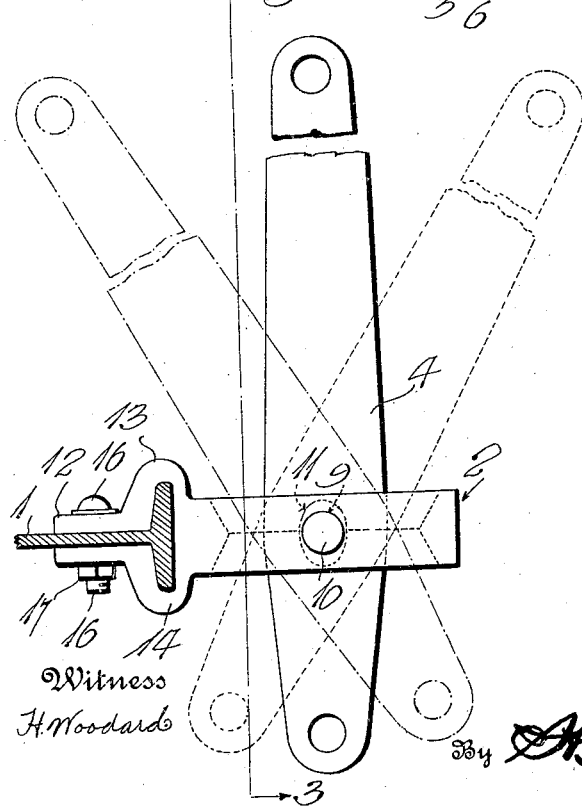
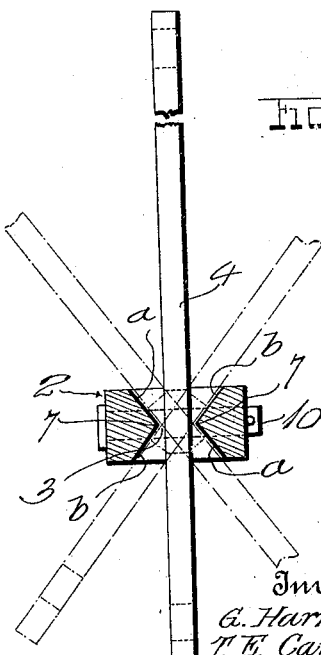
Witness
H. Woodard
Inventors
G. Harman
T. E. Cannon
N. C. Bettenburg
By H. B. Wilson & Co.
Attorneys

UNITED STATES PATENT OFFICE.

GEORGE HARMAN, THOMAS E. CANNON, AND NICHLAUS C. BETTENBURG, OF ST. PAUL, MINNESOTA.

BRAKE-BEAM FULCRUM.

1,374,448.

Specification of Letters Patent.

Patented Apr. 12, 1921.

Application filed February 12, 1920. Serial No. 358,249.

*To all whom it may concern:*

Be it known that we, GEORGE HARMAN, THOMAS E. CANNON, and NICHLAUS C. BETTENBURG, citizens of the United States, residing at St. Paul, in the county of Ramsey and State of Minnesota, have invented certain new and useful Improvements in Brake-Beam Fulcrums; and we do declare the following to be a full, clear, and exact description of the invention, such as will enable others skilled in the art to which it appertains to make and use the same.

Our invention relates to improvements in brake beam fulcrums often spoken of as the brake lever post or strut.

The primary object of the invention is to provide a brake beam fulcrum which is so constructed and designed that it may be employed to hold the brake lever in a right hand, left hand or central position for connection to the brake-rigging, it being readily convertible from one to another position without removal from the beam.

Another object of the invention is to provide a device of the above mentioned type which is a great deal more simple in construction than those known to us, one which is strong, durable, effective in operation and inexpensive to manufacture.

Other objects and advantages of the invention will become apparent during the course of the following description.

In the accompanying drawings forming a part of this specification and in which like numerals are employed to designate like parts throughout the same, Figure 1 is a plan view of a device constructed in accordance with our invention.

Fig. 2 is a side elevation, the brake beam being shown in section, and the brake lever in a central position.

Fig. 3 is a section on the line 3—3 of Fig. 2, the lever being in a central position, the right and left hand positions being shown in dotted lines.

Fig. 4 is a detail perspective view of the fulcrum frame or block.

In the drawings wherein for the purpose of illustration is shown a preferred form of our invention, the numeral 1 indicates a conventional brake beam of the ordinary shape to which our improved brake beam fulcrum is detachably secured.

Our invention resides in the fulcrum frame or brake lever post designated as a whole by the numeral 2, which is preferably cast in one solid piece, and is substantially rectangular in configuration. This frame is provided with a slot 3 for the reception of the usual brake lever 4. The inner faces of the side bars 5 and end bars 6 of the frame are beveled in opposite directions from their longitudinal centers 7 to their edges, thus forming parallel inwardly diverging walls *a—a*, and *b—b* which permits the brake lever 4 to be positioned at the proper angle for use on either side of the car, it being understood, that the angle of the brake lever is governed by the position and arrangement of the brake-rigging (not shown). The side bars 5 are apertured at 9 for receiving the fulcrum pin 10 upon which the brake lever is supported. The pin 10 is removable as shown. The brake lever is provided with an oval-shaped aperture 11 which forms the pivotal bearing therefor, and serves to permit it to be properly angled between the inner faces or walls of the frame 2.

One of the end bars 6 is provided with flanges 12 which constitute a pair of clamping heads 13 and 14. These clamping heads in effect form jaws which straddle the vertical flanges of the brake beam 1. These clamping jaws are provided with an aperture 15, and are secured to the brake beam by means of a bolt 16 passed through said apertures 15 and openings formed in the brake beam, the parts being secured against disengagement by a nut 17 or other suitable fastening device, as more clearly illustrated in Fig. 2.

It will now be seen that the brake lever 4 may be readily held at either of three angles, that is, it may either be in a line with the walls *a—a* or the walls *b—b* of the slot 3, (Fig. 3). These two positions of the brake lever are mostly used, but on some cars the brake-rigging is so arranged that a central position will be found necessary, and as shown in this figure in full lines, the brake lever 4 may also assume a central position.

However, in any of the three positions the brake lever will be prevented from undue wiggling on the pin 10 as it will be retained and guided by the inner beveled faces of the bars 5 and 6 of the frame 2.

It is believed that the manner of assembling the parts is obvious from the drawing and description, therefore explanation of this point is deemed unnecessary.

It is to be understood that the form of our invention herein shown and described is to be taken as a preferred form of the same and that various changes in the shape, size, and arrangement of the parts may be resorted to without departing from the spirit of the invention or the scope of the subjoined claims.

Having thus described our invention, what we claim is:

1. A brake beam fulcrum comprising a frame provided with a slot for receiving a brake lever, the inner faces of each of the side bars of the frame being beveled in opposite directions from its longitudinal center to its edges, a centrally disposed pin extending transversely between said side bars, and a brake lever pivotally mounted on said pin, whereby it may be positioned for right hand, left hand or central connection to the brake-rigging.

2. A brake beam fulcrum comprising a substantially rectangular frame cast from a single piece of metal and provided with a slot for receiving a brake lever, the inner faces of each of the side bars and end bars of the frame being beveled in opposite directions from its longitudinal center to its edges, said side bars being also provided with centrally disposed alined apertures, a pin extending transversely through said apertures in the side bars, a brake lever pivotally mounted on said pin, whereby it may be positioned for right hand, left hand and central connection to the brake-rigging, said frame also including integral clamping heads adapted to slide on and straddle a brake beam, said clamping heads being provided with apertures for fastening them to the brake beam.

In testimony whereof we have hereunto set our hands.

GEORGE HARMAN.
THOMAS E. CANNON.
NICHLAUS C. BETTENBURG.